Jan. 28, 1958     R. D. SHALD     2,821,217
BLADE ATTACHMENT FOR DOZERS

Filed June 24, 1955     2 Sheets-Sheet 1

Richard D. Shald
INVENTOR.

Jan. 28, 1958 R. D. SHALD 2,821,217
BLADE ATTACHMENT FOR DOZERS
Filed June 24, 1955 2 Sheets-Sheet 2

Richard D. Shald
INVENTOR.

BY *Clarence A. O'Brien*
*and Harvey B. Jackson*
Attorneys

United States Patent Office 2,821,217
Patented Jan. 28, 1958

2,821,217

BLADE ATTACHMENT FOR DOZERS

Richard D. Shald, Stuart, Nebr., assignor of fifty percent to John Shald, Stuart, Nebr.

Application June 24, 1955, Serial No. 517,725

2 Claims. (Cl. 144—34)

This invention relates generally to a blade attachment for dozers and is more particularly concerned with an angle blade attachment for cutting and clearing land.

The primary object of invention is to provide a V-shaped land-clearing blade attachment including a substantially horizontally disposed notched blade portion extending along the lower edge of said blade attachment, and including means for permitting ready adjustment of the blade relative to the tractor supported yoke, said blade including outwardly curved rearwardly divergent upper portions for clearing brush and similar debris.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
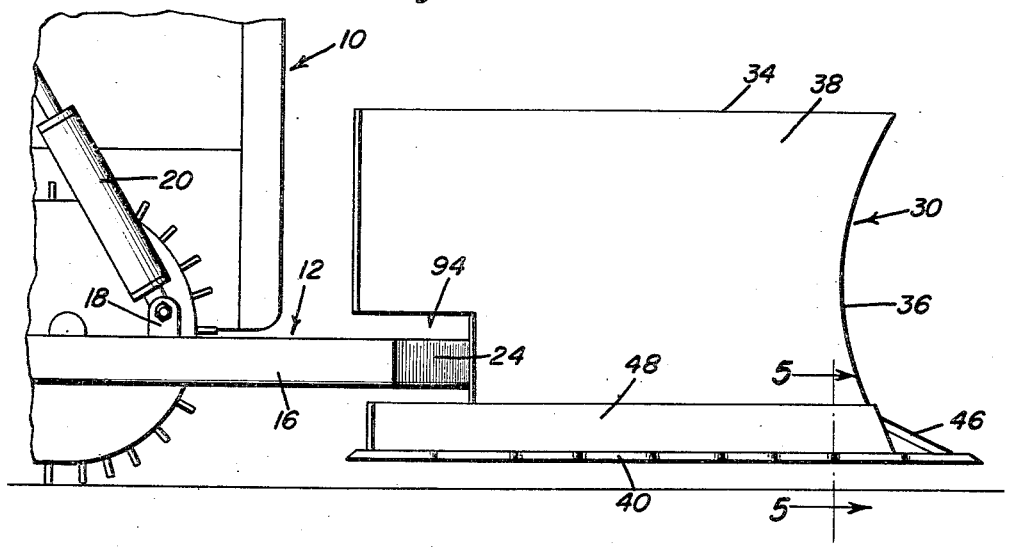
Figure 1 is a side elevational view of the novel blade attachment relative to a forward portion of the support tractor.

Indicated generally at 10 is the forward portion of a tractor which has pivotally mounted thereon suitable horizontal pivot pins (not shown), a vertically adjustable yoke 12, said yoke including rearwardly extending legs 14 and 16, each of which includes suitably disposed ears, 18 which have secured thereto a hydraulic fluid motor cylinder and piston assembly 20 which is suitably connected to a portion of the tractor 10 whereupon the yoke may be adjusted about the previously mentioned horizontal pivot pins. The previously mentioned structure is conventional and accordingly a further description is not believed necessary.

The arms 14 and 16 of the support yoke include inwardly directed forward portions 22 and 24, respectively which are secured together by means of a pair of overlying plate elements 26 and 28.

Figure 4:
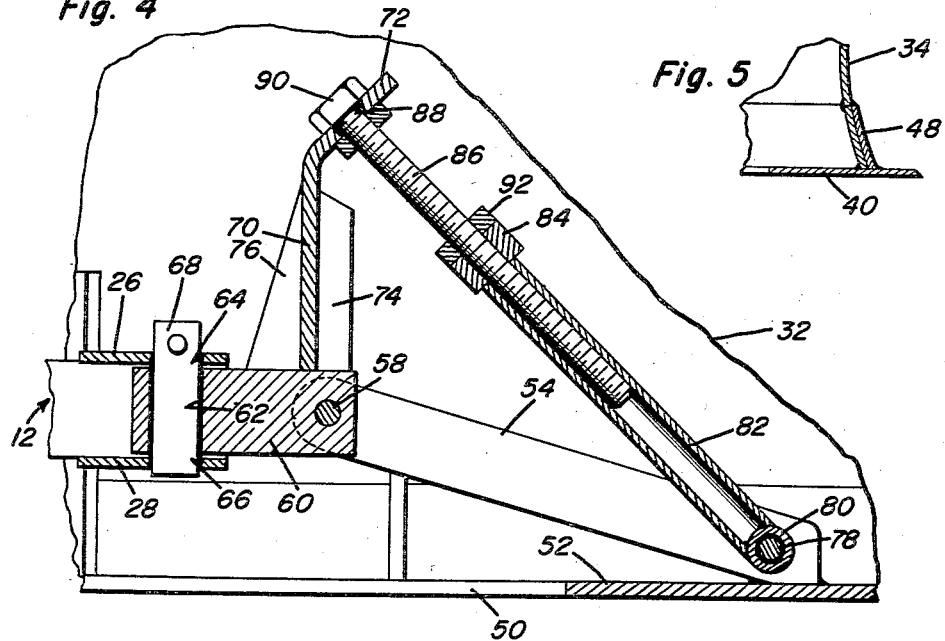
Figure 4 is an enlarged sectional view taken substantially on line 4—4 of Figure 2.
Figure 5:
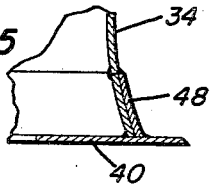
Figure 5 is a sectional view taken substantially on line 5—5 of Figure 1.

The V-shaped clearing blade attachment is indicated generally at 30 and includes a pair of rearwardly diverging side blade portions 32 and 34 which intersect on a forward apex portion 36, said blades being secured together by means of welding, for example. The side blades 32 and 34 each includes an upwardly curved portion 38 which terminates in a horizontal brush cutting blade portion 40 secured on the lower edge thereof. The blade portions 40 intersect at a circular cutting portion 42, the outer edges of said blades comprising a plurality of cutting notches or steps extending rearwardly from the circular cutting portion 42 as indicated at 44. A vertically extending cutter blade 46 is provided from the circular forward cutting portion 42 and extends upwardly into the apex portion 36 of the blade attachment. A moldboard strip 48 having the configuration of the curved portion 38 of the blades 32 and 34 is provided in overlying relationship to the blade portions, see Figure 4, and is secured to the horizontally extending blade portion 40 by means of welding, for example.

Thus when the blade attachment 30 is urged into contact with trees or heavy brush, for example, the notched blade portions 44 provide a step-by-step cutting action wherein the notch portion slipping by a relatively large tree will permit the tractor to gain traction and thus the blade is highly efficient for clearing of this character.

It will be noted that the horizontal blade portions 40 include portions extending toward each other between the side blades 32 and 34, these portions being indicated at 50. The intersection of the horizontal blade portions 50 and the forward portion of the blade attachment is indicated at 52 and has secured thereon, by means of welding, for example, the ends of a pair of spaced upwardly and rearwardly extending elongated lever elements 54 and 56 which are pivotally connected at their opposite end by means of a suitable pivot pin 58 to a connecting tongue 60 which contains vertical aperture 62 therein which will be aligned with apertured portions 64 and 66 on plates 26 and 28, respectively, of the yoke 12, said connecting tongue being secured to plates by means of a suitable connecting pin 68. Secured to an upper surface portion of the connecting tongue 60 is an upwardly extending bracket element 70 which has an angular upper end portion 72. The bracket element 70 is reinforced on the tongue element 60 by means of suitable reinforcing gusset plate portions 74 and 76. A pivot pin 78 extends between the lever elements 54 and 56, adjacent the lower end thereof, and have journalled thereon an extensible brace made of a tubular element 80 which has extending therefrom at right angles an upwardly extending tubular element 82. The element 82 has secured at its upper end, by means of welding, for example, a nut element 84 which threadedly receives an adjusting bolt 86 which extends through a suitable aperture 88 contained in the portion 72 of the bracket 70. The bolt 86 includes a conventional head portion 90 and has threadedly disposed thereon a lock nut 92 for retaining the fixed adjusted position of the blade attachment. By rotating the bolt 86, after the lock nut 92 has been backed away from the nut 84 of the tubular element 82, it is possible to adjust the forward end of the blade attachment relative to a pivot pin 58, thus attaining the desired angle of attack for the horizontal cutter blade portions 40 of said clearing blade.

Figure 2:
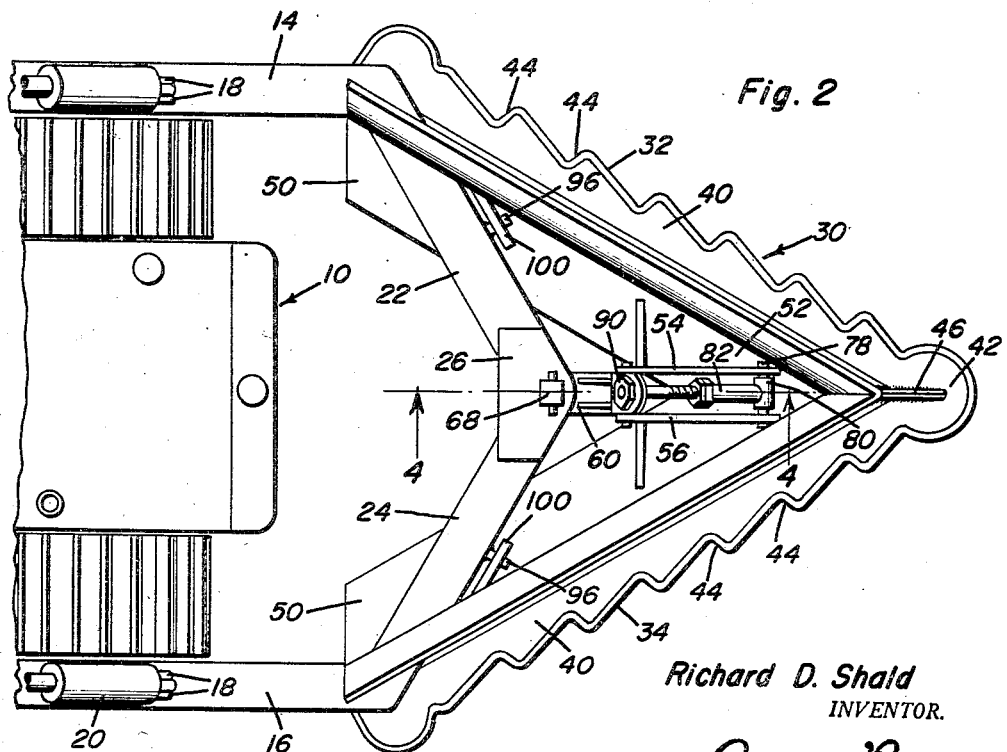
Figure 2 is a top plan view of the novel blade attachment relative to the forward portion of the support tractor.
Figure 3:
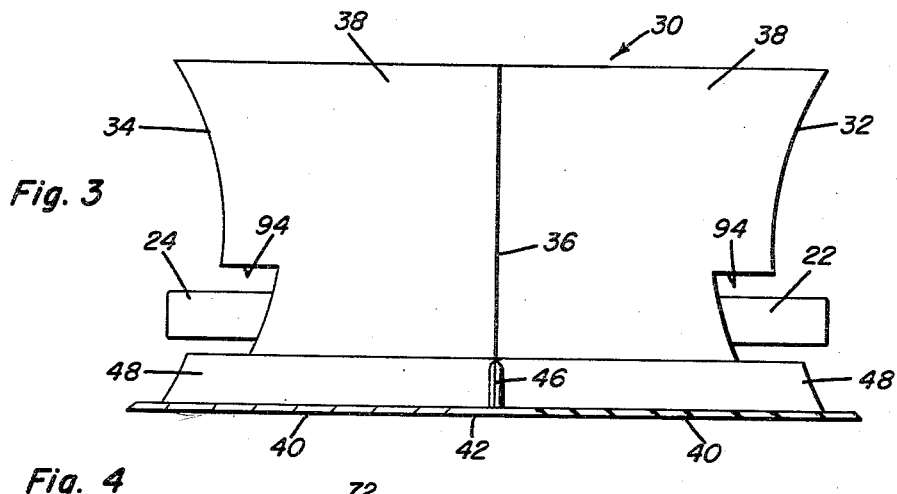
Figure 3 is a front elevational view of the novel blade attachment.
Figure 6:
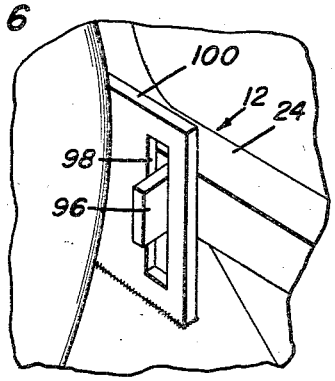
Figure 6 is a perspective view of a lost motion connection between a tractor supported yoke and the blade attachment.

The blade portions 38 of both side blades 32 and 34 include rearwardly opening notched out portions 94 which overlie the yoke portions 22 and 24 providing sufficient clearance there-between to permit the previously mentioned adjustment. The yoke portions 22 and 24, each including at right angles thereto forwardly extending stop or guide elements 96, see Figures 2 and 6, which are received in vertically extending slots 98 of guide plates 100 which are secured on an inner portion of the upwardly curved portions of the blades 32 and 34. It will be observed that in adjusting the blade attachment 30, the slots 98 of the plates 100 will permit relative movement between the yoke 12 and the blade attachment.

Removal of the blade attachment 30 and the mounting yoke 12 is accomplished by merely removing the connecting pin 68 from the aligned apertures 62, 64 and 66, whereupon the tractor and yoke may be backed away from the blade attachment. There is sufficient clearance between the walls of slots 98 and the elements 96 to permit elements 100 and elements 96 to become disengaged when the tractor is moved away from the attachment.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for the forwardly extending yoke of a vehicle, said attachment comprising a blade which has a pair of rearwardly diverging sides, said sides being arranged on the outside of said yoke, a pair of rearwardly diverging blades at the lower edges of said sides, said sides constituting a moldboard, said blades having parts which protrude in advance of said sides and are provided with cutting edges, said blades having flat bottom surfaces, a tongue, means attaching one end of said tongue to said yoke, an upstanding bracket fixed to said tongue, levers mounted for pivotal movement about an axis that is approximately horizontal, said levers being capable of pivoting about the last mentioned axis and with regard to said tongue, the forward ends of said levers being fixed to said blades and spaced from each other, a forward pivot located between said levers and connected thereto, an extensible brace pivoted at one end to said forward pivot, said extensible brace including a pair of elements which are adjustable with respect to each other, one of said elements being pivoted to said forward pivot and the other of said elements being connected to said upstanding bracket.

2. An attachment for the forwardly extending yoke of a vehicle, said attachment comprising a blade which has a pair of rearwardly diverging sides, said sides being arranged on the outside of said yoke, a pair of rearwardly diverging blades at the lower edges of said sides, said sides constituting a moldboard, said blades having parts which protrude in advance of said sides and are provided with cutting edges, said blades having flat bottom surfaces, a tongue, a connecting pin separably attaching one end of said tongue to said yoke, an upstanding bracket fixed to said tongue, levers mounted for pivotal movement about an axis that is approximately horizontal, said levers being capable of pivoting about the last mentioned axis and with regard to said tongue, the forward ends of said levers being fixed to said blades and spaced from each other, a forward pivot located between said levers and connected thereto, an extensible brace pivoted at one end to said forward pivot, said extensible brace including a pair of elements which are adjustable with respect to each other, one of said elements being pivoted to said forward pivot and the other of said elements being connected to said upstanding bracket, lost motion connecting means secured to said sides and to spaced parts of said yoke to partially support said attachment and yet permit some relative movement between said attachment and said yoke, said sides having notches through which parts of said yoke pass, said lost motion connecting means located adjacent to said notches.

References Cited in the file of this patent

UNITED STATES PATENTS

| | | |
|---|---|---|
| 2,336,124 | Phoenix | Dec. 7, 1943 |
| 2,485,407 | Peterson | Oct. 18, 1949 |
| 2,633,164 | Kissner | Mar. 31, 1953 |
| 2,650,628 | Long | Sept. 1, 1953 |